(12) United States Patent
Hass et al.

(10) Patent No.: US 6,725,255 B1
(45) Date of Patent: Apr. 20, 2004

(54) SYSTEM AND METHOD FOR TRACKING AND REPORTING DATA TRANSMISSION AND RECEIPT

(75) Inventors: Lior Hass, Tel Aviv (IL); Roni Or, Bney Atarot (IL)

(73) Assignee: BackWeb Technologies Ltd., Ramat Gan (IL)

( * ) Notice: Subject to any disclaimer, the term of this patent is extended or adjusted under 35 U.S.C. 154(b) by 0 days.

(21) Appl. No.: 09/382,798

(22) Filed: Aug. 25, 1999

(51) Int. Cl.[7] .............................................. G06F 15/16
(52) U.S. Cl. ....................... 709/206; 709/227; 709/224; 709/235; 709/311; 345/744; 345/752; 379/93.24
(58) Field of Search ................................. 709/224, 235, 709/206

(56) References Cited

U.S. PATENT DOCUMENTS

| | | | |
|---|---|---|---|
| 4,584,679 A | * 4/1986 | Livingston et al. | 370/448 |
| 5,748,884 A | * 5/1998 | Royce et al. | 714/57 |
| 5,872,970 A | * 2/1999 | Pickett et al. | 709/101 |
| 6,006,351 A | * 12/1999 | Peretz et al. | 379/444 |
| 6,301,621 B1 | * 10/2001 | Haverstock et al. | 345/963 |
| 6,317,485 B1 | * 11/2001 | Homan et al. | 379/88.12 |

* cited by examiner

*Primary Examiner*—Ayaz Sheikh
*Assistant Examiner*—Syed A. Zia
(74) *Attorney, Agent, or Firm*—Fliesler Meyer LLP

(57) ABSTRACT

A system and method for tracking a data transmission, and for reporting the receipt of the data transmission and the level and/or type of interaction between the intended recipient user and the data transmission. Preferably, the length of time which elapses before the user receives the data transmission is measured and compared to a predetermined period of time. If the intended recipient user does not receive the data transmission within a predetermined period of time, and/or if the intended recipient user does not interact with the data transmission according to the predetermined level and/or type of interaction, then preferably the intended recipient user receives a data transmission through a different communication medium, such as voice mail if the original medium was e-mail, for example. More preferably, the sender user and/or another designated user is notified if such a period of time has elapsed.

20 Claims, 3 Drawing Sheets compare lengths of time
(step 9b)

SYSTEM AND METHOD FOR TRACKING AND REPORTING DATA TRANSMISSION AND RECEIPT

FIELD AND BACKGROUND OF THE INVENTION

The present invention relates to a system and method for tracking data transmissions, and for reporting on the receipt of such transmissions by the intended recipient, including the quality of interaction with the data transmission by the recipient. In particular, the system and method of the present invention provide a mechanism for notifying the sender of the quality of such an interaction.

Networks which connect two or more computers, such as the Internet or intranets, enable client computers to obtain data transmissions, such as documents, images, messages, data packages or other types of data, from remote storage media which are not installed on the client computer itself. Instead, these remote storage media are managed and operated through a remote computer, known as a server computer or simply as a "server" (in the same vein, the client computer is also often termed only a "client"). The data transmission may then be sent to a recipient user at a particular user address and/or user computer by a sending user, such that the data transmission is "pushed", or transmitted by request of a user other than the recipient user. One example of a "push" technology is e-mail (electronic mail), in which the ending user controls when the e-mail message is sent, while the recipient user passively receives the e-mail message at a particular e-mail address. Typically, the messages at such an e-mail address may be accessed from a plurality of different computers. Thus, the recipient user may optionally choose to receive, or "download", the e-mail messages at a convenient computer.

One difficulty with e-mail, as well as with other "push" technologies, is that the quality of the interaction of the recipient user with the e-mail message is difficult to ascertain. Indeed, unless the sending user and the recipient user share a common e-mail software within a common network, the sending user may not even be able to determine whether the e-mail message has been received at all. Furthermore, the existing solutions within the context of sharing a common e-mail software within a common network do not provide a mechanism for notifying the sending user if the message has not been received by the recipient user, or if the recipient user has not interacted with the message sufficiently. In addition, these existing solutions do not provide any mechanism for attempting to contact the recipient user through another communication medium, such as voice mail for example, in order to notify the recipient user of the existence of the message. Also, the existing solutions are restricted to e-mail alone, and are not useful for tracking and reporting on other types of data transmissions within the context of "push" technologies. Thus, existing solutions have many disadvantages.

Therefore, there is an unmet need for, and it would be highly useful to have, a system and method for tracking and reporting various types of data transmissions within the context of "push" technologies, such as e-mail, for determining the type of interaction between the recipient user and a particular data transmission, and for notifying the sending user and/or the recipient user through the same or an alternative communication medium if the initial data transmission has not been satisfactorily received.

SUMMARY OF THE INVENTION

The present invention is of a system and method for tracking a data transmission, and for reporting the receipt of the data transmission and the level and/or type of interaction between the intended recipient user and the data transmission. If the intended recipient user does not receive the data transmission within a predetermined period of time, and/or if the intended recipient user does not interact with the data transmission according to the predetermined level and/or type of interaction, then preferably the intended recipient user receives a data transmission through a different communication medium, such as voice mail if the original medium was e-mail, for example. More preferably, the sender user and/or another designated user is notified if such a period of time has elapsed.

According to the present invention, there is provided a method for reporting an interaction of a recipient user with a data transmission, the method comprising the steps of: (a) providing a recipient client for receiving the data transmission, and a server for sending the data transmission; (b) sending the data transmission from the server to the recipient client; (c) if the data transmission is successfully received by the recipient client, reporting a successful receipt of the data transmission to the server; (d) determining the interaction of the recipient user with the data transmission by the recipient client; and (e) reporting the interaction to the server.

According to another embodiment of the present invention, there is provided a system for reporting an interaction of a recipient user with a data transmission, the system comprising: (a) a server for sending the data transmission; (b) a recipient client for receiving the data transmission and for the interaction with the recipient user; (c) a client agent for reporting a report of the interaction, the client agent being operated by the recipient client; (d) a server agent for receiving the report of the interaction and for sending a notification if the interaction is not performed; and (e) a sender agent for receiving the notification. As an example, lack of performance of an interaction could be determined according to an elapsed period of time, such that if the interaction does not occur, the interaction is designated as not performed. Lack of performance may be absolute, if no interaction occurred for example, or relative, if the desired level or degree of interaction is not performed for example.

Hereinafter, the term "protocol based on TCP/IP" includes any such protocol, including but not limited to the HTTP (hypertext transfer protocol) and FTP (file transfer protocol) protocols.

Hereinafter, the term "data transmission" refers to any discrete, identifiable unit of data, including but not limited to documents, images, e-mail messages, voice mail messages, paging messages, data packages or any other type of data.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group. Hereinafter, the term "Web server" refers to a computer or other electronic device which is capable of serving at least one Web page to a Web browser. Hereinafter, the term "applet" refers to a self-contained software module written in an applet language such as Java or constructed as an ActiveX™ control.

Hereinafter, the term "network" refers to a connection between any two computers which permits the transmission of data.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the terms "computer user" and "user" both refer to the person who operates the Web browser or other GUI interface and navigates through the system of the present invention by operating a computer.

Hereinafter, the term "computer" refers to a combination of a particular computer hardware system and a particular software operating system. Examples of such hardware systems include those with any type of suitable data processor. Hereinafter, the term "computer" includes, but is not limited to, personal computers (PC) having an operating system such as DOS, Windows™, OS/$_2$™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; or any other known and available operating system. Hereinafter, the term "Windows™" includes but is not limited to Windows95™, Windows 3.X™ in which "x" is an integer such as "1", Windows NT™, Windows98™, Windows CE™ and any upgraded versions of these operating systems by Microsoft Inc. (Seattle, Wash., USA).

For the present invention, a software application could be written in substantially any suitable programming language, which could easily be selected by one of ordinary skill in the art. The programming language chosen should be compatible with the computer by which the software application is executed, and in particularly with the operating system of that computer. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware, or a combination thereof.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for tracking a data transmission, and for reporting the receipt of the data transmission and the level and/or type of interaction between the intended recipient user and the data transmission. Preferably, the length of time which elapses before the user receives the data transmission is measured and compared to a predetermined period of time. If the intended recipient user does not receive the data transmission within a predetermined period of time, and/or if the intended recipient user does not interact with the data transmission according to the predetermined level and/or type of interaction, then preferably the intended recipient user receives a data transmission through a different communication medium, such as voice mail if the original medium was e-mail, for example. More preferably, the sender user and/or another designated user is notified if such a period of time has elapsed.

Most preferably, the data transmission is composed of segments, such that each level and/or type of interaction is represented by each segment or combination thereof. Therefore, as each segment is presented to the user, an interaction with that segment is recorded and at some point in time is passed to the sender user and/or another designated user.

The principles and operation of the system and method according to the present invention may be better understood with reference to the drawings and the accompanying description.

Figure 1:
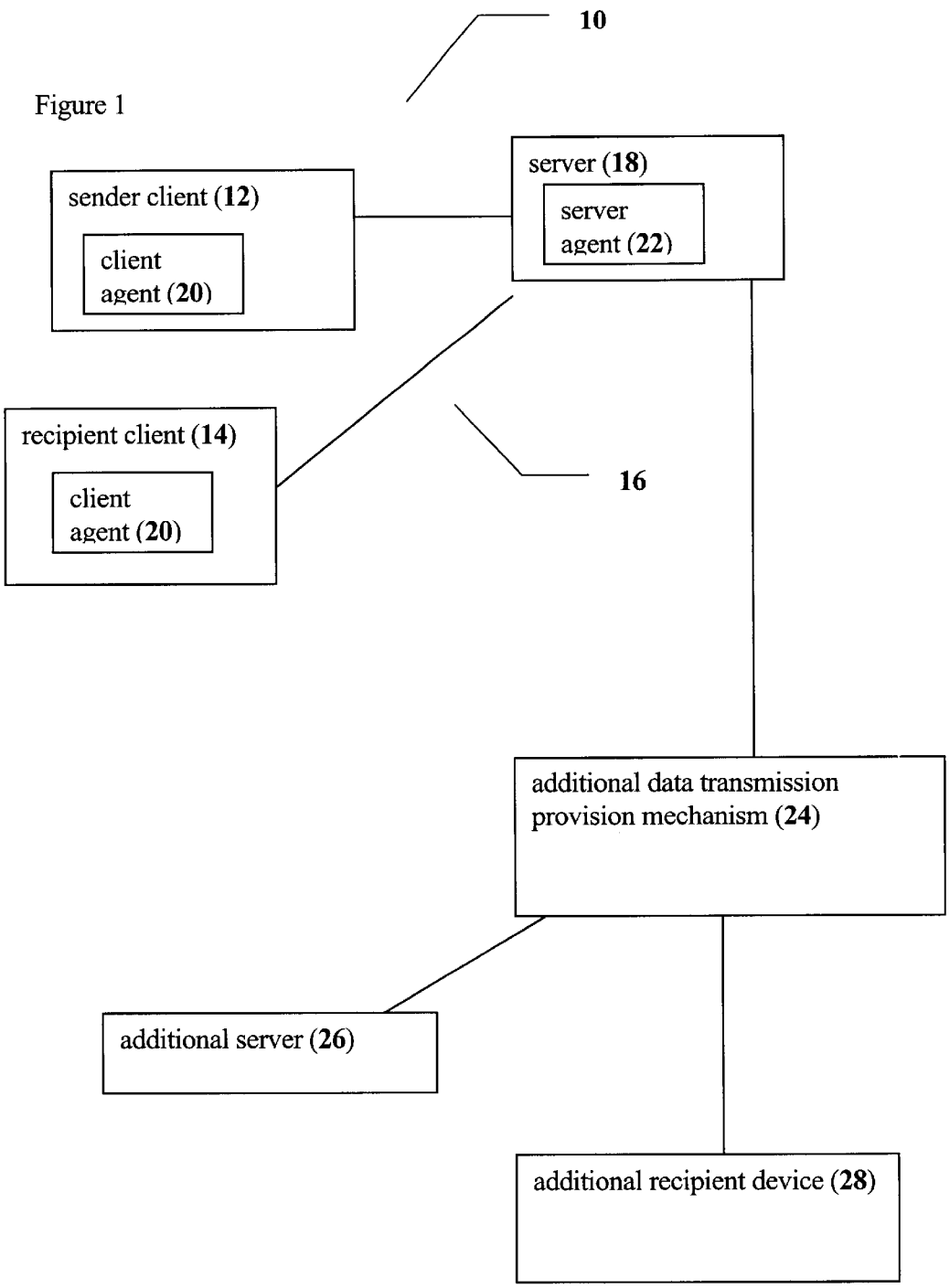
FIG. 1 is a schematic block diagram of an exemplary system according to the present invention.
Figure 2:
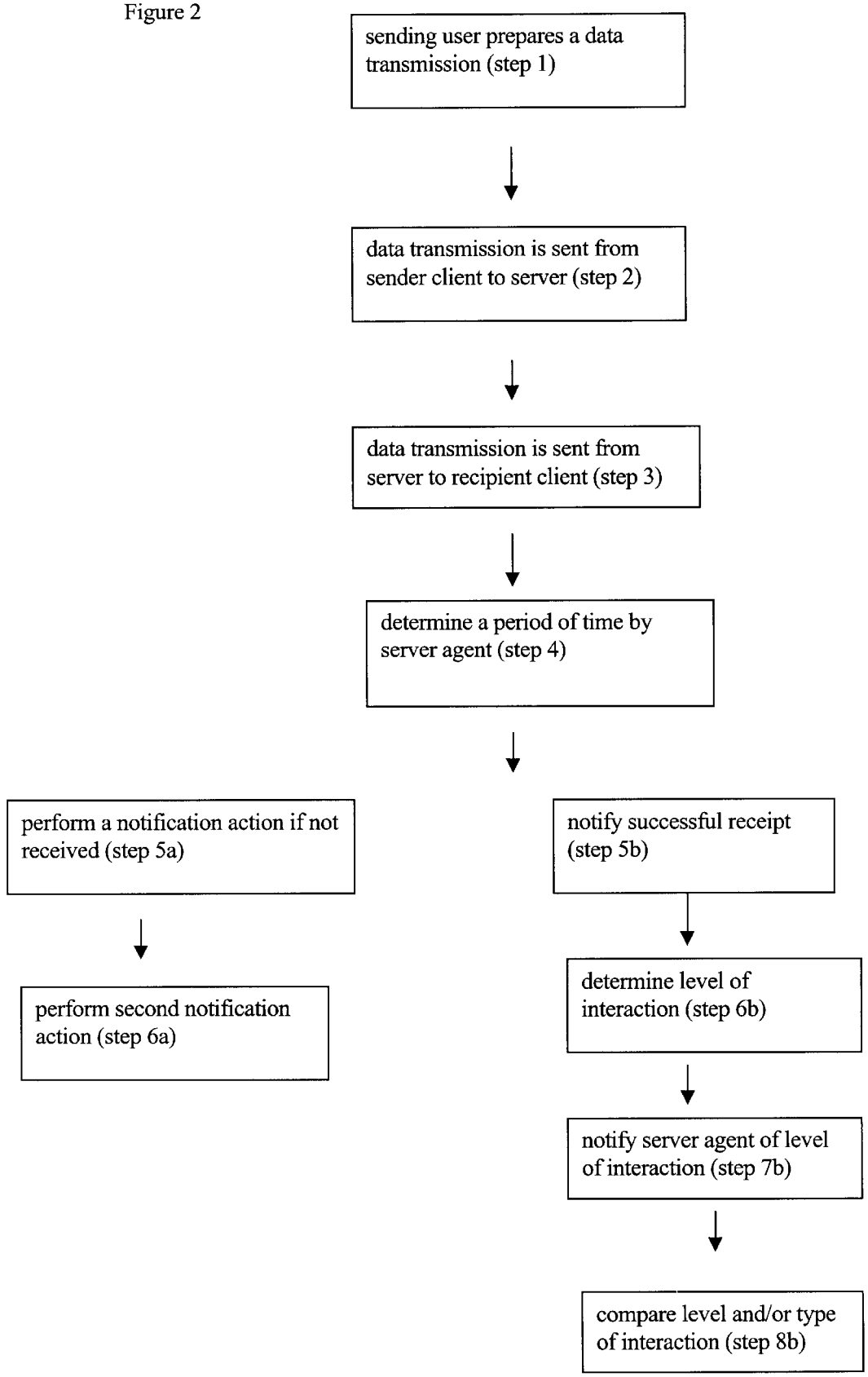
FIG. 2 is a flowchart of an exemplary method according to the present invention.
Figure 2:

FIG. 1 is a schematic block diagram of an exemplary system according to the present invention, while FIG. 2 is a flowchart of the operation of the system of FIG. 1. FIG. 1 shows a system 10 which includes a sender client 12 and a recipient client 14 connected by a network 16 of some type, for example a LAN. It is understood that sender client 12 and recipient client 14 are preferably different functional aspects of a particular type of client, such that this type of client is able to both send and receive data transmissions through these separate functional components. Each of sender client 12 and recipient client 14 is also connected to a server 18 of some type. Although only one server 18 is shown, a plurality of servers could also be implemented. Server 18 is optionally and preferably a dedicated server, in the sense that this server has a primary or at least a substantially significant role as a server for data transmissions. Preferably, server 18 sends data transmissions through a "push" mechanism.

More preferably, each of sender client 12 and recipient client 14 also operates a client agent 20, while server 18 also operates a server agent 22. Client agent 20 is able to monitor the transmission and receipt of data transmissions, respectively. In addition, with regard to the receipt of a data transmission, client agent 20 is preferably able to determine the type of interaction by the recipient user with the received data transmission. Also, client agent 20 is able to communicate directly with server agent 22, in order to alert server agent 22 as to whether recipient client 14 has received the data transmission, and more preferably, as to whether the recipient user has examined the received data transmission.

Examples of the type of data transmissions which could be provided through server 18 include, but are not limited to, e-mail messages, voice mail messages, paging messages, direct telephonic communication, facsimile transmissions and transmissions provided by the software application of BackWeb™ (BackWeb Technologies Ltd., Ramat Gan, Israel).

System 10 also preferably features an additional data transmission provision mechanism 24. Additional data transmission provision mechanism 24 is preferably, but not necessarily, different than such a data transmission mechanism as provided through server 18. Additional data transmission provision mechanism 24 preferably features an additional server 26 and an additional recipient device 28 for access by the recipient user of recipient client 14. For example, if server 18 provides e-mail message transmission, such that recipient client 14 is able to receive and access these e-mail messages, then additional server 26 is optionally a voice mail transmitter, preferably of automatic, generated and/or recorded, voice mail messages, while additional recipient device 28 is then preferably a telephone or other access device for accessing the voice mail messages.

Although the operation of system 10 is described below with regard to e-mail messages, it is understood that this is for the purposes of description only and without any intention of being limiting. The operation of system 10 according to the present invention is illustrated with reference also to the flowchart of the exemplary method of the present invention in FIG. 2.

In step 1, the sending user prepares a data transmission. This step may be performed in advance, such that the sending user does not need to actually manually trigger the transmission of the data. Preferably, in step 2, the data transmission is sent from sender client 12 to server 18. In step 3, the data transmission is sent by server 18 to recipient client 14.

In step 4, preferably, server agent 22 determines a period of time from the time that the data transmission is sent by server 18 to recipient client 14, to the time that recipient client 14 notifies server agent 22 of the successful receipt of the data transmission.

If recipient client 14 does not notify server agent 22 of the successful receipt of the data transmission within a predetermined period of time, then server agent 22 preferably performs a notification action in step 5a. Such a notification action may optionally and preferably include any of the following actions, alone or in combination.

For example, server agent 22 may attempt to contact the intended recipient user through additional data transmission provision mechanism 24. Preferably, additional data transmission provision mechanism 24 is more intrusive than the original transmission mechanism provided through server 18. By "intrusive", it is meant that this mechanism for transmission performs one or more actions to more immediately attract the attention of the intended recipient user, and hence to more aggressively "push" the data transmission. For example, if server 18 originally sent an e-mail message, then additional data transmission provision mechanism 24 may optionally and preferably include at least one of a voice mail message, a pager message, and even a direct telephonic communication, for example to a mobile telephone.

The notification data transmission which is sent through additional data transmission provision mechanism 24 is preferably automatically generated, for example with a voice synthesizer for voice data. Alternatively, the notification data transmission may be recorded for voice data by sender user or another user, and then sent through additional data transmission provision mechanism 24. For other types of notification data transmissions, such as e-mail or facsimile, the data is preferably automatically or alternatively prepared in advance by a user, in a similar manner according to the type of data.

In step 6a, if server agent 22 still does not receive the notification of successful receipt of the original data transmission within a second predetermined period of time, then preferably server agent 22 performs a second notification action. As noted previously, preferably such a second notification action is more intrusive than the first notification action. The second notification action may also be sent to the intended recipient user. Alternatively and preferably, the second notification action is sent to an alternative user, optionally an individual who is in authority over the intended recipient user in an organization, for example, or an individual who ensures the proper operation of system 10, as another example. More preferably, the second notification action is sent to the original sender user of the original data transmission. The second notification action may be performed through a similar or different additional data transmission provision mechanism 24.

The advantage of system 10 is that the sender user, and/or another user designated by the sender user and/or server 18, is made aware of the state of the data transmission. More preferably, the sender user and/or another designated user is made aware of the state beyond simple receipt or lack thereof, as described in greater detail below.

Client agent 20 on recipient client 14 preferably notifies server agent 22 of the successful receipt of the data transmission in step 5b.

In step 6b, assuming such notification of the successful receipt of the data transmission, client agent 20 on recipient client 14 determines the level of interaction of the user with the data transmission. Preferably, the data transmission is composed of a plurality of segments, each segment representing a different level and/or type of interaction with the data transmission. For example, if the data transmission is an e-mail message, then the e-mail message preferably features several segments, each of which is separately presented to the intended recipient by client agent 20, alone or in conjunction with another software application. Client agent 20 would then note when, as well as if, each segment is examined by the intended recipient user. Such a determination can be used to measure the level and/or type of interaction by the intended recipient user with the data transmission.

In step 7b, client agent 20 of recipient client 14 preferably notifies server agent 22 of the level and/or type of interaction performed between the intended recipient user and the received data transmission. Optionally and more preferably, if client agent 20 is unable to contact server agent 22 immediately, then client agent 20 stores a plurality of these reports and sends them in a group when contact is resumed.

In step 8b, server agent 22 preferably compares the level and/or type of interaction performed against the requested level and/or type of interaction as requested by the sender user. Optionally and more preferably, in step 9b, server agent 22 also compares the length of time elapsed since recipient client 14 successfully received the data transmission, to the length of time permitted to perform a certain level and/or type of interaction by the intended recipient user, such that if the permitted length of time is exceeded, the sender user and/or alternative designated user is notified as previously described above.

Most preferably, if the intended recipient user deletes or otherwise destroys the data transmission without performing the requested type and/or level of interaction, then server agent 22 also notifies the sender user and/or alternative designated user as previously described.

As noted previously, additional data transmission provision mechanism 24 may optionally and preferably include at least one of a voice mail message, a pager message, and even a direct telephonic communication, for example to a mobile telephone. These mechanisms may be implemented as follows. It is understood that the following examples are given for the purposes of description and illustration only, and are not intended to be limiting in any way.

First, voice mail messages may be provided through the Internet according to the VPIM (Voice Profile for Internet Mail) standard, as described in greater detail in RFC 2421 (http://www.ietf.org/rfc/rfc2321.txt as of Aug. 18, 1999). This standard enables voice messaging to be provided according to the MIME and ESMTP protocols which are Internet standard protocols. Therefore, one of ordinary skill in the art could easily implement a voice mail messaging mechanism which is compatible with system 10 according to the present invention through the VPIM standard.

Second, automatic telephonic contact may be provided through the TAPI (Telephone Applications Programming Interface) standard. Interfaces which are compatible with TAPI, and hence which may be used to provided such automatic telephonic contact, are available from a number of vendors, including but not limited to, Microsoft Corp. (USA). In particular, TAPI is designed for integration with a client-server system such as system 10 of the present invention, for the provision of telephonic data transmission, and particularly automatic data transmission. Therefore, one of ordinary skill in the art could easily implement a telephonic data transmission mechanism which is compatible with system 10 according to the present invention through the TAPI standard.

Third, SkyTel™ is an exemplary pager service for sending text to a pager device from a computer. Information about this service is available from http://www.skytel.com/Paging as of Aug. 18, 1999. Such a service could be incorporated by one of ordinary skill in the art in order to provide the data transmission mechanism for sending data to a pager device according to the present invention.

While the invention has been described with respect to a limited number of embodiments, it will be appreciated that many variations, modifications and other applications of the invention may be made.

What is claimed is:

1. A method for reporting an interaction of a recipient user with a data transmission composed of at least one segment, the method comprising the steps of:

providing a recipient client for receiving the data transmission, and a server for sending the data transmission;

sending the data transmission from said server to said recipient client;

reporting a successful receipt of the data transmission to said server if the data transmission is successfully received by said recipient client;

presenting the data transmission to the recipient user;

determining a level of interaction of the recipient user with the data transmission based on the number of segments examined by the recipient user; and reporting the level of interaction to the server.

2. The method of claim 1, wherein if the data transmission is not successfully received by said recipient client, the method further comprises the step of:

performing a notification action by said server.

3. The method of claim 2, wherein said notification action is performed from said server to an original sender user responsible for preparing the data transmission.

4. The method of claim 2, wherein said notification action is performed from said server to the recipient user.

5. The method of claim 2, wherein said notification action is performed from said server to at least one designated user.

6. The method of claim 2, further comprising:

sending a second data transmission according to an additional data transmission mechanism, such that said additional data transmission mechanism is different than an original transmission mechanism for sending the data transmission.

7. The method of claim 6, wherein said additional data transmission mechanism is more intrusive than said original transmission mechanism.

8. The method of claim 7, wherein said original transmission mechanism is e-mail (electronic mail) and said additional data transmission mechanism is selected form the group consisting of voice mail messaging, pager device messaging, facsimile transmission and telephonic communication.

9. The method of claim 1, wherein an original transmission mechanism for sending the data transmission is selected from the group consisting of e-mail, voice mail messaging, pager device messaging, facsimile transmission and telephonic communication.

10. The method of claim 1, further comprising:

performing a notification action by said server if the data transmission is successfully received by the recipient client but the recipient client has no interaction with the data transmission.

11. The method of claim 10, further comprising:

measuring a period of time by said server before the recipient user interacts with the data transmission, such that if said period of time is greater than a predetermined period of time, said server performs said notification action.

12. The method of claim 1, wherein:

the data transmission is presented to the recipient user by a client agent.

13. The method of claim 12, wherein:

the client agent utilizes a software application to present the data transmission to the recipient user.

14. The method of claim 10, wherein said notification action is performed from said server to an original sender user responsible for preparing the data transmission.

15. The method of claim 10, wherein said notification action is performed from said server to the recipient user.

16. The method of claim 10, wherein said notification action is performed from said server to at least one designated user.

17. The method of claim 10, further comprising:

sending a second data transmission according to an additional data transmission mechanism, such that said additional data transmission mechanism is different than an original transmission mechanism for sending the data transmission.

18. The method of claim 10, wherein said additional data transmission mechanism is more intrusive than said original transmission mechanism.

19. The method of claim 18, wherein said original transmission mechanism is e-mail (electronic mail) and said additional data transmission mechanism is selected from the group consisting of voice mail messaging, pager device messaging, facsimile transmission and telephonic communication.

20. A system for reporting an interaction of a recipient user with a data transmission composed of at least one segment, the system comprising:

a server for sending the data transmission;

a recipient client for receiving the data transmission;

a client agent to provide the data transmission to the recipient user, and wherein the client agent determines a level of interaction of the recipient user with the data transmission based on the number of segments examined by the recipient user, and wherein the client agent provides a report of the interaction, said client agent being coupled to said recipient client;

a server agent for receiving said report of the interaction and for sending a notification if the interaction is not performed; and a sender agent for receiving said notification.

* * * * *